(12) United States Patent
Stednitz et al.

(10) Patent No.: US 10,550,999 B2
(45) Date of Patent: Feb. 4, 2020

(54) DIRECT DIFFUSE VAPOR SEPARATOR—STEAM TRAP SYSTEM

(71) Applicant: Strahman Valves, Inc., Bethlehem, PA (US)

(72) Inventors: Samuel Gregory Stednitz, St. Clair, PA (US); George Albert Lundberg, Jr., Pompton Plains, NJ (US)

(73) Assignee: Strahman Valves, Inc., Bethlehem, PA (US)

( * ) Notice: Subject to any disclaimer, the term of this patent is extended or adjusted under 35 U.S.C. 154(b) by 24 days.

(21) Appl. No.: 15/880,740

(22) Filed: Jan. 26, 2018

(65) Prior Publication Data
US 2018/0245738 A1 Aug. 30, 2018

Related U.S. Application Data

(60) Provisional application No. 62/463,964, filed on Feb. 27, 2017.

(51) Int. Cl.
| | | |
|---|---|---|
| *F16T 1/38* | (2006.01) | |
| *F16T 1/34* | (2006.01) | |
| *F16L 55/07* | (2006.01) | |

(52) U.S. Cl.
CPC .............. *F16T 1/38* (2013.01); *F16L 55/07* (2013.01); *F16T 1/34* (2013.01)

(58) Field of Classification Search
CPC ....... F16T 1/00; F16T 1/02; F16T 1/34; F16T 1/36; F16T 1/38; F16T 1/45; F16L 55/07; F22B 37/30; F22B 37/26
See application file for complete search history.

(56) References Cited

U.S. PATENT DOCUMENTS

| | | | | |
|---|---|---|---|---|
| 1,328,889 A | * | 1/1920 | Oleson | F22B 37/28 55/423 |
| 1,382,100 A | | 6/1921 | Lindstrom | |
| 1,464,988 A | * | 8/1923 | Hansen | F21L 23/00 362/160 |
| 1,494,387 A | | 5/1924 | Spuhr | |

(Continued)

FOREIGN PATENT DOCUMENTS

| | | |
|---|---|---|
| DE | 47829 C | 12/1888 |
| DE | 1 600 820 A1 | 4/1970 |

(Continued)

OTHER PUBLICATIONS

Extended European search report with the European search opinion issued for corresponding European Patent Application No. 18158660.3 dated Jul. 30, 2018.

*Primary Examiner* — Ian G Paquette
(74) *Attorney, Agent, or Firm* — Myers Wolin, LLC

(57) ABSTRACT

A device for separating liquid from gas including: a fluid inlet configured to receive a fluid that includes a liquid and a gas; a gas outlet; a deflector positioned between the fluid inlet and the gas outlet, the deflector obstructing a path from the fluid inlet to the gas outlet; and a liquid channel adjacent to a liquid outlet; wherein the deflector is configured to deflect the liquid to the liquid channel; wherein the liquid deflected to the liquid channel exits the device through the liquid outlet; and wherein the gas flows around the deflector and exits the device through the gas outlet.

14 Claims, 5 Drawing Sheets

(56) References Cited

U.S. PATENT DOCUMENTS

| | | | | | |
|---|---|---|---|---|---|
| 3,266,726 | A | * | 8/1966 | Fujiwara | F16T 1/10 236/100 |
| 3,288,367 | A | * | 11/1966 | Monroe, Jr. | F16T 1/10 236/56 |
| 4,548,047 | A | * | 10/1985 | Hayashi | F16K 31/0648 236/75 |
| 2013/0220434 | A1 | | 8/2013 | Zhang et al. | |

FOREIGN PATENT DOCUMENTS

| | | |
|---|---|---|
| DE | 24 58 252 A1 | 6/1976 |
| DE | 10 2014 012 166 A1 | 2/2016 |
| DE | 10 2014 013 372 A1 | 3/2016 |
| EP | 2 530 257 A2 | 12/2012 |
| GB | 2481446 A | 12/2011 |

* cited by examiner

DIRECT DIFFUSE VAPOR SEPARATOR—STEAM TRAP SYSTEM

CROSS REFERENCE TO RELATED APPLICATIONS

This application claims the benefit of U.S. Provisional Application No. 62/463,964 filed on Feb. 27, 2017, the contents of which are herein incorporated by reference.

FIELD OF THE INVENTION

The invention generally relates to fluid flow control devices. More particularly, the invention relates to a direct diffuse vapor separator for separating liquid from gas in a fluid stream.

BACKGROUND

In many systems, it is advantageous to separate liquid matter from gaseous matter in a process steam. A device that separates liquid from gas or vapor has many practical applications. For example, a device for the removal of water particulate from natural gas transporting pipe line systems is needed in order to protect valves, pumps and similar equipment. In the production of specialty gases, such as helium, it is desirable to remove condensates from the gas production line. Furthermore, in steam supply systems, the efficiency may improve if water or other liquid is removed. Another application of such device is for the compressed air systems where water and oil need to be separated from the air.

In order to facilitate clear and concrete discussions of the device, a practical example of a vapor separator for steam systems, i.e., a stream trap is disclosed in greater detail. A steam trap is a valve device that discharges condensate and air from the line or piece of equipment without discharging the steam.

The three important functions of steam traps are:
To discharge condensate as soon as it is formed.
Not to allow steam to escape.
To be capable of discharging air and other incondensable gases.

There are three basic types of steam trap as classified by the international Standard ISO 6704:1982:
1. Thermostatic (operated by changes in fluid temperature)—The temperature of saturated steam is determined by its pressure. In the steam space, steam gives up its enthalpy of evaporation (heat), producing condensate at steam temperature. As a result of any further heat loss, the temperature of the condensate will fall. A thermostatic trap will pass condensate when this lower temperature is sensed. As steam reaches the trap, the temperature increases and the trap closes.
2. Mechanical (operated by changes in fluid density)—This range of steam traps operates by sensing the difference in density between steam and condensate. These steam traps include "ball float traps" and "inverted bucket traps." In the "ball float trap," the ball rises in the presence of condensate, opening a valve which passes the denser condensate. With the "inverted bucket trap," the inverted bucket floats when steam reaches the trap and rises to shut the valve. Both are essentially "mechanical" in their method of operation.
3. Thermodynamic (operated by changes in fluid dynamics)—Thermodynamic steam traps rely partly on the formation of flash steam from condensate. This group includes "thermodynamic," "disc," "impulse" and "labyrinth" steam traps.

However many conventional steam traps include moving mechanical parts, which may have a limited life span and may be expensive and complex to manufacture in order to provide a reliable and functional steam trap. Other conventional steam traps have complex linkages and levers that are prone to sticking, clogging, and/or binding (e.g., when bent by forces of a water hammer). These conventional steam traps are generally installed off-line from the steam transportation line, requiring addition plumbing installation and taking up addition space.

Many of these same problems are also present in other systems, such as natural gas transporting pipe line systems, compressed air systems, specialty gas production systems, etc., as mentioned above.

Therefore, there is a need for a new low-cost, in-line diffuse vapor separation device that is simple in its design to provide reliable and consistent removal of condensate with minimal vapor loss, and without the need for additional plumbing.

SUMMARY

One embodiment of the present invention provides a device for separating liquid from gas including: a fluid inlet configured to receive a fluid that includes a liquid and a gas; a gas outlet; a deflector positioned between the fluid inlet and the gas outlet, the deflector obstructing a path from the fluid inlet to the gas outlet; and a liquid channel adjacent to a liquid outlet; wherein the deflector is configured to deflect the liquid to the liquid channel; wherein the liquid deflected to the liquid channel exits the device through the liquid outlet; and wherein the gas flows around the deflector and exits the device through the gas outlet.

One embodiment of the present invention provides a steam system including a steam trap connected in-line to a steam pipe carrying a fluid that includes a liquid and steam, wherein the steam trap includes: a fluid inlet configured to receive the fluid; a steam outlet; a deflector positioned between the fluid inlet and the steam outlet, the deflector obstructing a path from the fluid inlet to the steam outlet; and a liquid channel adjacent to a liquid outlet; wherein the deflector is configured to deflect the liquid to the liquid channel; wherein the liquid deflected to the liquid channel exits the device through the liquid outlet; and wherein steam flows around the deflector and exits the device through the steam outlet.

DETAILED DESCRIPTION OF THE PREFERRED EMBODIMENTS

Figure 1:
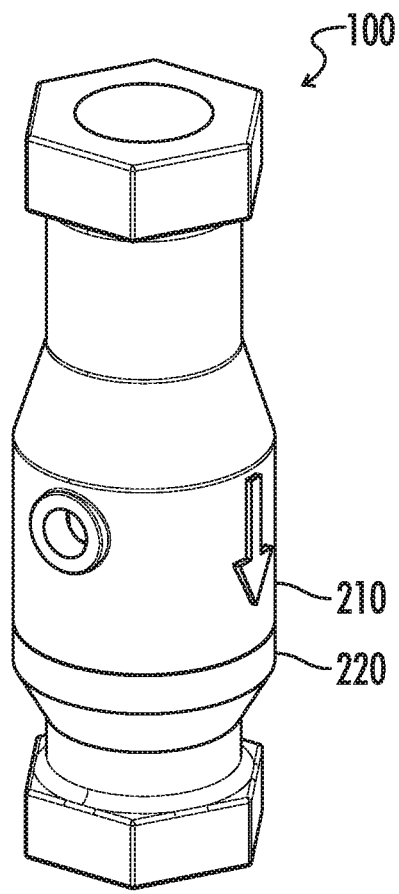
FIG. 1 is a perspective view of a vapor separator in accordance with an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

An example embodiment of the present invention provides an in-line steam trap that ensures that a steam system will operate more efficiently by virtually eliminating condensate in the steam line. The unique, compact design of the steam trap according to an embodiment can be mounted either vertically or horizontally, and is installed directly into the steam line, eliminating the need for additional plumbing. Adding the steam trap according to an embodiment to a steam mixing unit set up reduces condensate in the steam line, reduces rust caused by condensate, and significantly reduces maintenance costs.

FIG. 1 shows a vapor separator 100 in accordance with an embodiment. As can be seen from FIG. 1, the vapor separator is compact in size and can be installed in-line to the process steam line. In a preferred embodiment, an arrow indicating the flow direction of the fluid is provided on the outside surface of the vapor separator so as to provide a visual guide for installation or maintenance.

Figure 2:
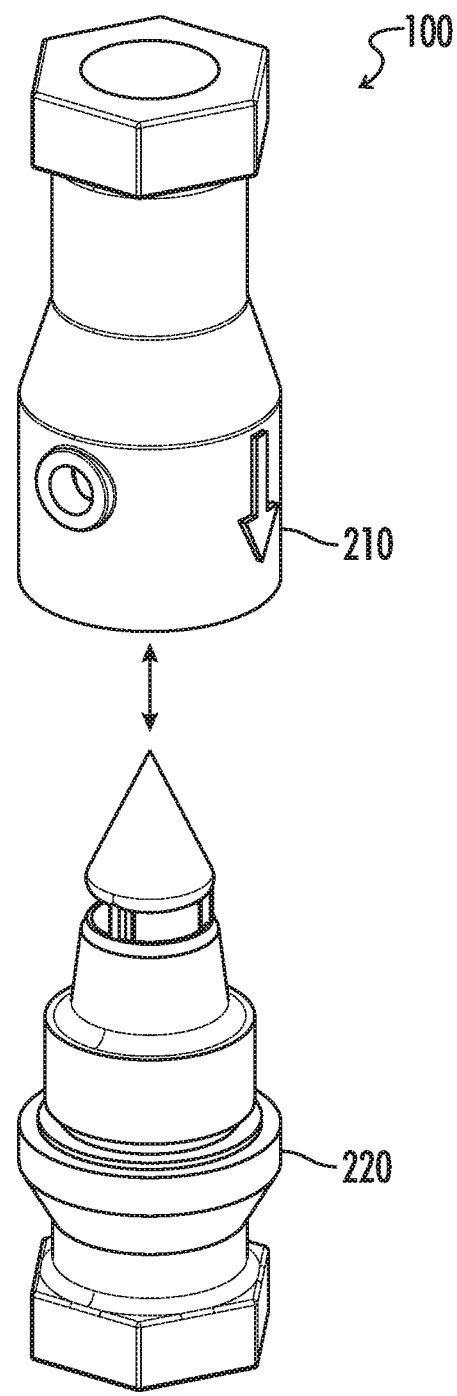
FIG. 2 shows a top part and a bottom part of a vapor separator in accordance with an embodiment.

In one embodiment, the vapor separator includes a top part and a bottom part. FIG. 2 shows the top part 210 and the bottom part 220. In one embodiment, the top part and the bottom part have matching pipe thread and can be joined by threading the top part to the bottom part. Note that, in addition to threading, other methods of joining the top and bottom parts, such as soldering, glue, etc., are contemplated.

Figure 3A:
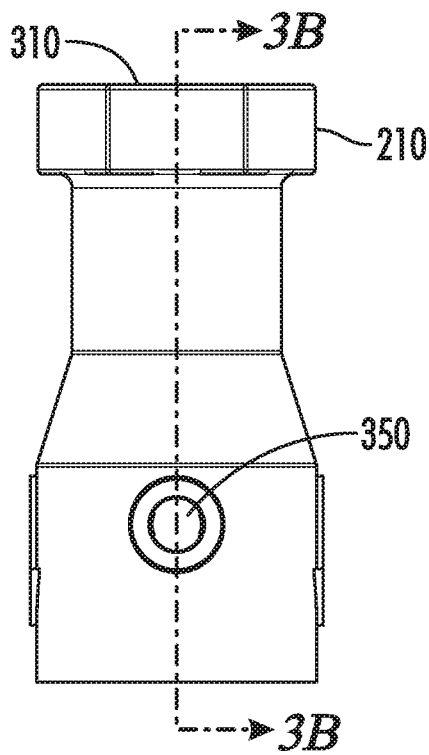
FIG. 3A is a side view and FIG. 3B is a cross-sectional view of a top part of a vapor separator in accordance with an embodiment.
Figure 3B:
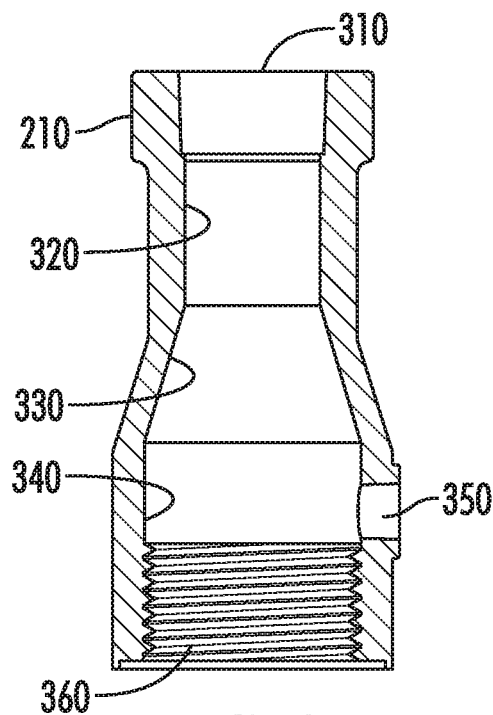

FIG. 3A shows the side view of the top part of the vapor separator, and FIG. 3B shows the cross-sectional view of the top part of the vapor separator. The top part has a fluid inlet 310. The fluid inlet may be threaded so that it can be connected to a threaded end of a steam delivery pipe. As can be seen in FIG. 3B, the inner diameter of the side wall 320 is smaller than the inner diameter of the side wall 340, the tapered side wall 330 gradually increases in diameter from that of the side wall 320 to that of the side wall 340. A liquid outlet 350 passes through the sidewall 340. The inner surface end 360 in the top part may be threaded or sized to match a corresponding coupling end in the bottom part.

Figure 4A:
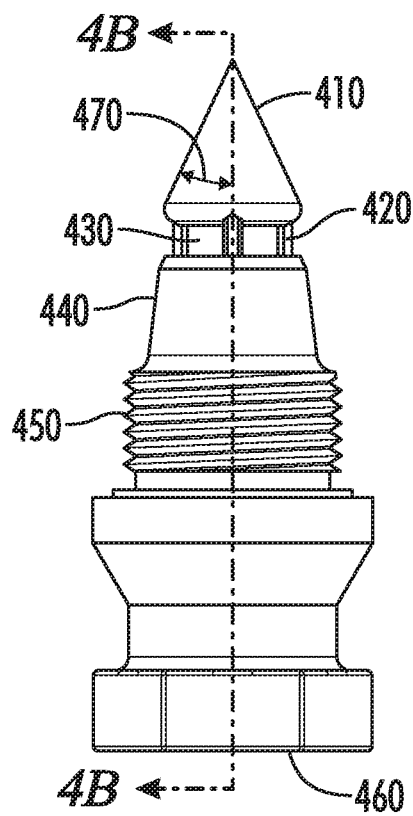
FIG. 4A is a side view and FIG. 4B is a cross-sectional view of a bottom part of a vapor separator in accordance with an embodiment.
Figure 4B:
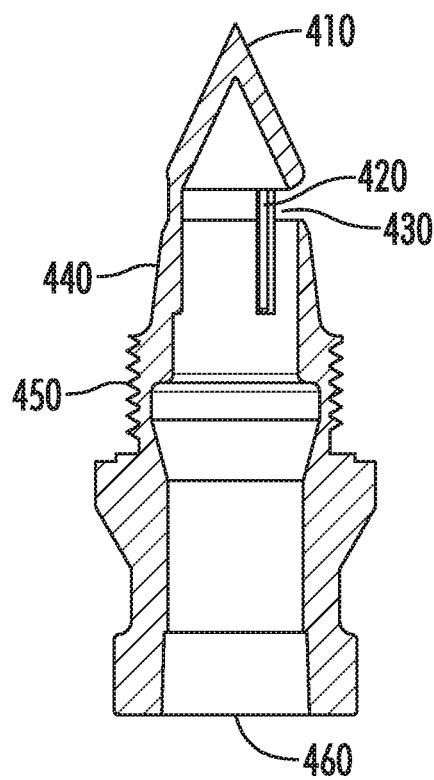

FIG. 4A shows the side view of the bottom part of the vapor separator, and FIG. 4B shows the cross-sectional view of the bottom part of the vapor separator. In one embodiment, the deflector 410 is cone-shaped. Note that in order to facilitate a smooth and streamlined flow of the fluid, as shown in FIGS. 4A and 4B, the outside edge of the base of the cone may be rounded and the surface of the cone rim makes an angle (e.g., 30 degrees) the horizontal. In general, the deflector can be any geometric shape with its diameter having a first value at one end and gradually increases to a second value at the other end. In some embodiments, the deflector may be a paraboloid, frustum, pyramid, etc. The deflector 410 is fixed to and supported above the gas outlet 460 by one or more support columns 420, such that the deflector 410 blocks a direct path to the gas outlet 460, but leaves a gap 430 for the gas to enter the gas outlet 460. The side wall 440 of the bottom part has an outer diameter smaller than the inner diameter of the side wall 340 of the top part. When the wall 450 of the bottom part engages with the inner surface end 360 of the top part, a liquid channel is formed between the side wall 440 of the bottom part and the side wall 340 of the top part. Liquid deflected by the deflector is collected in the liquid channel. In one embodiment, the fluid inlet, the gas outlet, and the liquid channel are each rotationally symmetrical about a rotational axis, and wherein the deflector is conical and centered about the rotational axis. In one embodiment, the deflector has the shape of a right circular cone, and preferably the half-angle 470 of the cone is about 25 degrees.

Figure 5:
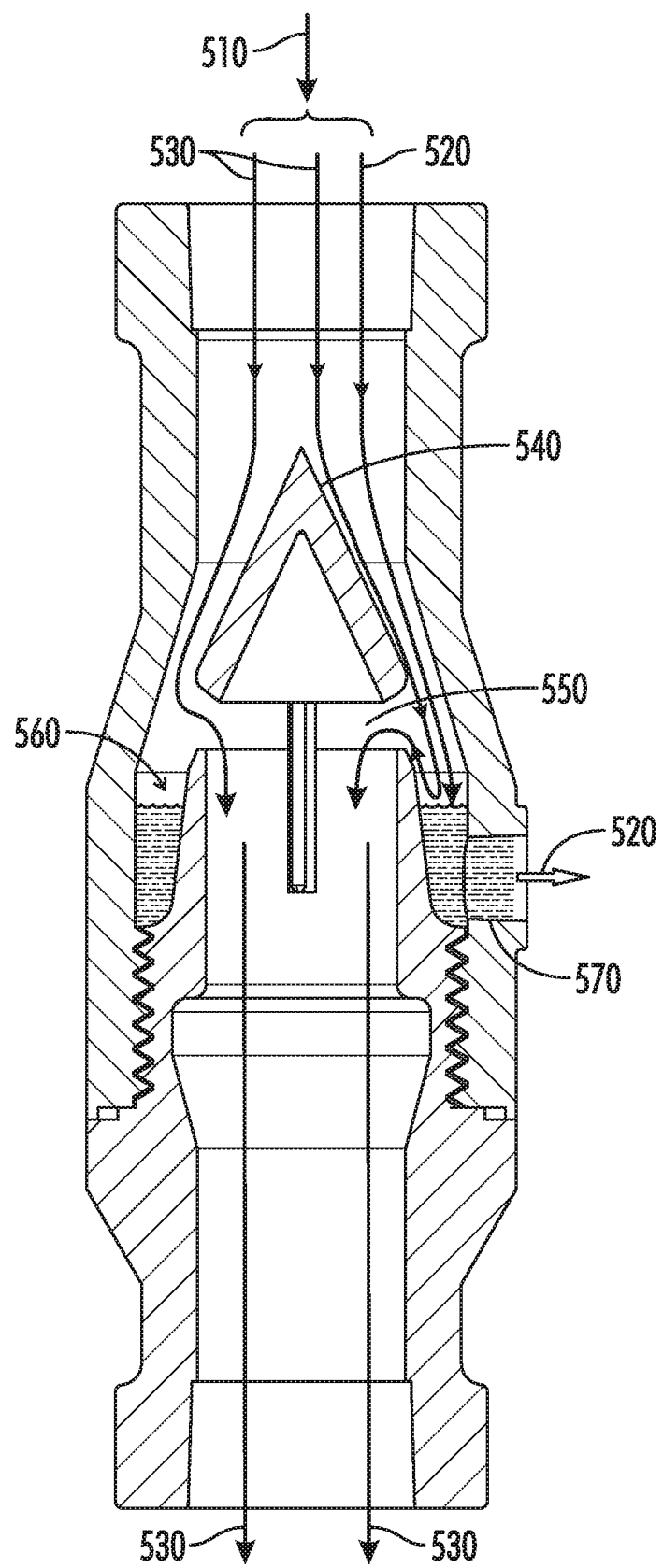
FIG. 5 illustrates the operation of a vapor separator in accordance with an embodiment.

FIG. 5 illustrates the operation of the vapor separator in accordance with an embodiment. A fluid 510 enters the vapor separator via the fluid inlet. In this non-limiting example, the fluid 510 includes at least a liquid 520 and a gas 530. The liquid 520 is deflected by the deflector 540 to the liquid channel 560, and the deflected liquid 520 exits the vapor separator through the liquid outlet 570, The gas 530 flows around the deflector and enters the gas outlet via the gap 550. Note that when the liquid 520 accumulates in the channel 560, the liquid 520 blocks the liquid outlet 570 and thus the gas 530 cannot escape through the liquid outlet 570.

Figure 6:
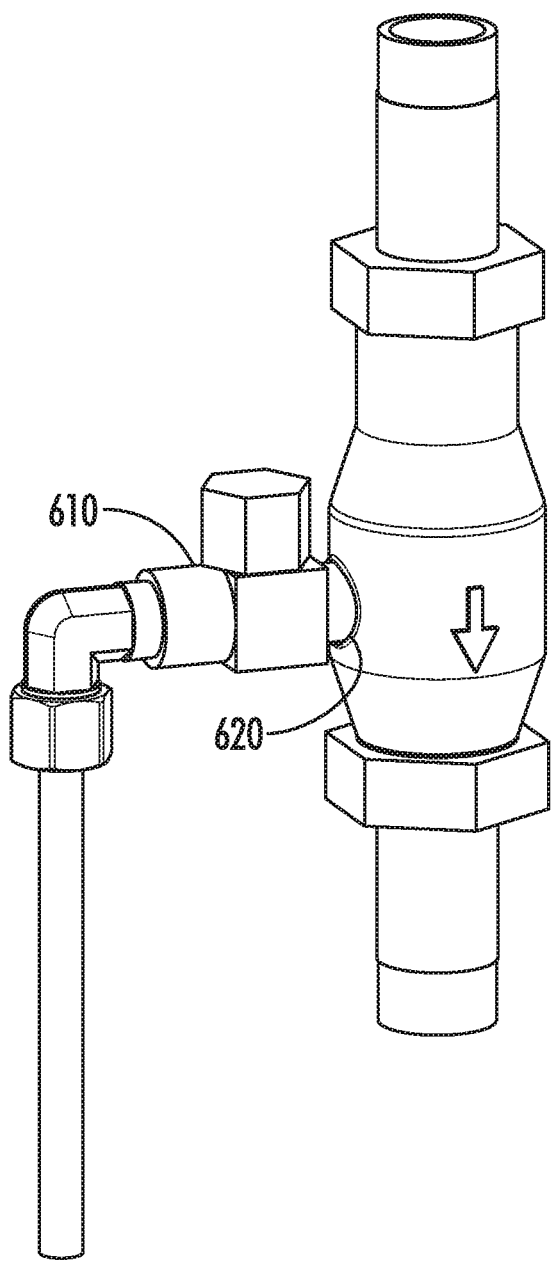
FIG. 6 illustrates a vapor separator with a check valve installed in accordance with an embodiment.

As shown in FIG. 6, the gas may be prevented from escaping through the liquid outlet 620 by installing a valve 610. In one embodiment, the valve is a thermo-electric valve. When gas is present, the temperature is high and the valve is closed, and thus the gas cannot escape. When liquid is present, the temperature is low and the valve is open, and thus the liquid can exit. As can be seen from FIG. 6, the vapor separator is installed in-line to the process line. In contrast, conventional steam traps are generally installed off-line from the steam transportation line, requiring addition plumbing installation and taking up addition space.

Figure 7:
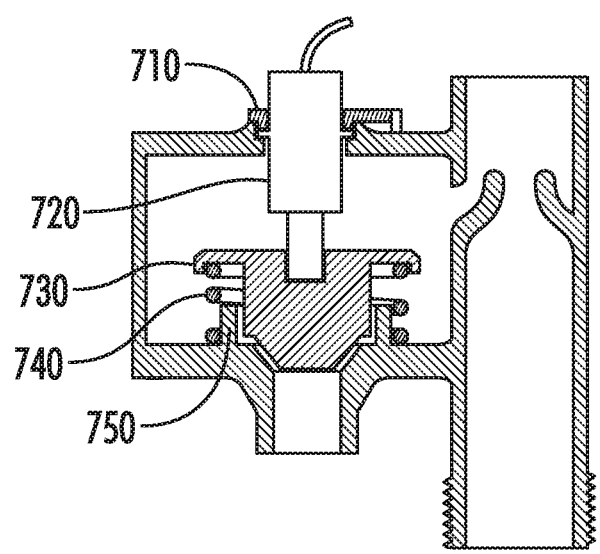
FIG. 7 illustrates the operation of a thermo-electric valve in accordance with an embodiment.

FIG. 7 shows a thermo-electric valve according to an embodiment. The valve 730 is supported by the off-open spring 740. The guide 750 guides the valve 730 to seal the entrance when the valve is pushed to the closed position by the thermo-electric element 720. When high temperature is sensed (e.g., by a thermocouple), the thermo-electric element 720 expands and pushes the valve 730 down to the close position. When low temperature is sensed, the thermo-electric element 720 contracts, and the spring 740 pushes the valve 730 up to the open position. Also shown in FIG. 7 is an access cover 710 to allow for servicing the parts in the thermo-electric valve.

Note that embodiments of the present invention are described and illustrated in some non-limiting applications of steam systems. However, it is contemplated that the present invention may be generally applied to other fluid systems, in which the fluid includes at least a gas and a liquid.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A device for separating liquid from gas comprising:
    a fluid inlet configured to receive a fluid that comprises a liquid and a gas;
    a gas outlet;
    a deflector positioned between the fluid inlet and the gas outlet, the deflector obstructing a path from the fluid inlet to the gas outlet; and
    a liquid channel adjacent to a liquid outlet;
    wherein the deflector is configured to deflect the liquid to the liquid channel;
    wherein the liquid deflected to the liquid channel exits the device through the liquid outlet; and
    wherein the gas flows around the deflector and exits the device through the gas outlet;
    wherein the fluid inlet, the as outlet, and the liquid channel are each rotationally symmetrical about a rotational axis, and wherein the deflector is conical and centered about the rotational axis.

2. The device of claim 1, wherein the fluid inlet and the gas outlet are configured to connect to pipes of a steam system.
3. The device of claim 1, wherein the surface of the deflector is at a 25 degree angle relative to the rotational axis.
4. The device of claim 1, wherein the deflector is fixed to and supported above a portion of the gas outlet.
5. The device of claim 4, wherein the deflector is fixed to and supported above the portion of the gas outlet by three columns evenly spaced about the perimeter of the gas outlet.
6. The device of claim 1, wherein the liquid outlet further comprises a valve for preventing the gas from escaping.
7. The device of claim 6, wherein the valve is a thermo-electric valve.
8. A steam system comprising a steam trap connected in-line to a steam pipe carrying a fluid that comprises a liquid and steam,
    wherein the steam trap comprises:
        a fluid inlet configure to receive the fluid;
        a steam outlet;
        a deflector positioned between the fluid inlet and the steam outlet, the deflector obstructing a path from the fluid inlet to the steam outlet; and
        a liquid channel adjacent to a liquid outlet;
        wherein the deflector is configured to deflect the liquid to the liquid channel;
        wherein the liquid deflected to the liquid channel exits the steam trap through the liquid outlet; and
        wherein steam flows around the deflector and exits the steam trap through the steam outlet;
        wherein the fluid inlet, the steam outlet, and the liquid channel are each rotationally symmetrical about a rotational axis, and wherein the deflector is conical and centered about the rotational axis.
9. The system of claim 8, wherein the deflector is fixed to and supported above a portion of the steam outlet.
10. The system of claim 8, wherein the deflector is fixed to and supported above the portion of the steam outlet by three columns evenly spaced about the perimeter of the steam outlet.
11. The system of claim 8, wherein the fluid inlet and the steam outlet are configured to connect to pipes of the steam system.
12. The system of claim 8, wherein the liquid outlet further comprises a valve for preventing the steam from escaping.
13. The system of claim 8, wherein the valve is a thermo-electric valve.
14. The system of claim 8, wherein the surface of the deflector is at a 25 degree angle relative to the rotational axis.

* * * * *